(12) United States Patent
Chien

(10) Patent No.: US 11,812,195 B2
(45) Date of Patent: *Nov. 7, 2023

(54) MULTIPLE FUNCTIONS LED NIGHT LIGHT

(71) Applicant: Tseng-Lu Chien, Walnut, CA (US)

(72) Inventor: Tseng-Lu Chien, Walnut, CA (US)

(73) Assignees: Aaron Chien, Walnut, CA (US);
Hsin-Yi Wang, Walnut, CA (US);
Te-Ju Chien, Walnut, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,759

(22) Filed: Aug. 2, 2021

(65) Prior Publication Data

US 2022/0021848 A1    Jan. 20, 2022

Related U.S. Application Data

(63) Continuation of application No. 11/806,285, filed on May 31, 2007, now Pat. No. 11,082,664, and a
(Continued)

(51) Int. Cl.
*F21S 8/00* (2006.01)
*H04N 7/18* (2006.01)
(Continued)

(52) U.S. Cl.
CPC ............... *H04N 7/181* (2013.01); *F21K 9/66* (2016.08); *F21S 4/28* (2016.01); *F21S 8/035* (2013.01);
(Continued)

(58) Field of Classification Search
CPC .. H04N 7/181; H04N 5/2252; H04N 5/23241; F21S 4/28; F21S 8/035; F21S 8/038; F21S 9/022; F21S 10/002; F21S 2/005; F21K 9/66; F21K 9/235; F21V 5/008; F21V 14/02; F21V 21/08; F21V 21/14; F21V 23/04; F21V 29/00; F21V 33/0052; F21V 9/08; F21V 19/0025; F21V 19/006; F21V 21/22; F21V 21/29;
(Continued)

(56) References Cited

U.S. PATENT DOCUMENTS 3,061,716 A    10/1962  Benander
3,974,495 A    8/1976   Jones
(Continued)

*Primary Examiner* — Bao Q Truong
(74) *Attorney, Agent, or Firm* — BACON&THOMAS,PLLC

(57) ABSTRACT

A multiple function LED night light has at least one LED device and added function(s) such as an air-freshener adaptor device, sonic device, frequency device, sensor device, bug repeller device, second light device, timepiece, electric message device, timer device, temperature device, surge protection device, electric short circuit protection device, base device for installation on an existing lamp socket, emergency light device, or any other electric device(s) suitable for home use to keep people comfortable or safe. The LED device has a first optic means to change the narrow-viewing angle of an LED's spot-light beams into a wider-viewing angle and second optic means to help make the LED night light exhibit a smooth lighting effect. The device may be arranged to fit into an existing night light bulb socket to turn any existing bulb night light into a power saving LED night light.

4 Claims, 8 Drawing Sheets

Related U.S. Application Data continuation of application No. 11/806,284, filed on May 31, 2007, now Pat. No. 7,632,004.

(51) Int. Cl.

| | |
|---|---|
| *F21S 9/02* | (2006.01) |
| *F21S 10/00* | (2006.01) |
| *F21V 14/02* | (2006.01) |
| *F21V 21/08* | (2006.01) |
| *F21V 21/14* | (2006.01) |
| *F21V 23/04* | (2006.01) |
| *F21V 29/00* | (2015.01) |
| *F21S 4/28* | (2016.01) |
| *F21K 9/66* | (2016.01) |
| *F21V 5/00* | (2018.01) |
| *H04N 23/51* | (2023.01) |
| *H04N 23/65* | (2023.01) |
| *G01S 3/786* | (2006.01) |
| *F21V 33/00* | (2006.01) |
| *F21V 9/08* | (2018.01) |
| *F21V 21/22* | (2006.01) |
| *F21V 21/29* | (2006.01) |
| *F21V 21/30* | (2006.01) |
| *F21W 121/00* | (2006.01) |
| *F21Y 115/15* | (2016.01) |
| *F21V 19/00* | (2006.01) |
| *F21S 2/00* | (2016.01) |
| *F21Y 115/10* | (2016.01) |
| *F21K 9/235* | (2016.01) |

(52) U.S. Cl.
CPC .............. *F21S 8/038* (2013.01); *F21S 9/022* (2013.01); *F21S 10/002* (2013.01); *F21V 5/008* (2013.01); *F21V 14/02* (2013.01); *F21V 21/08* (2013.01); *F21V 21/14* (2013.01); *F21V 23/04* (2013.01); *F21V 29/00* (2013.01); *F21V 33/0052* (2013.01); *G01S 3/7864* (2013.01); *H04N 23/51* (2023.01); *H04N 23/65* (2023.01); *F21K 9/235* (2016.08); *F21S 2/005* (2013.01); *F21V 9/08* (2013.01); *F21V 19/006* (2013.01); *F21V 19/0025* (2013.01); *F21V 21/22* (2013.01); *F21V 21/29* (2013.01); *F21V 21/30* (2013.01); *F21V 23/0442* (2013.01); *F21V 23/0492* (2013.01); *F21W 2121/00* (2013.01); *F21Y 2115/10* (2016.08); *F21Y 2115/15* (2016.08); *Y02B 10/30* (2013.01); *Y10S 362/80* (2013.01)

(58) Field of Classification Search
CPC .. F21V 21/30; F21V 23/0442; F21V 23/0492; G01S 3/7864; F21Y 2115/10; F21Y 2115/15; F21W 2121/00; Y02B 10/30; Y10S 362/80

See application file for complete search history.

(56) References Cited

U.S. PATENT DOCUMENTS

| | | |
|---|---|---|
| 4,000,405 A | 12/1976 | Horwinski |
| 4,816,973 A | 3/1989 | Atalla et al. |
| 5,309,334 A | 5/1994 | Willison |
| 5,402,702 A | 4/1995 | Hata |
| 5,924,784 A | 7/1999 | Chliwnyj et al. |
| 6,010,228 A | 1/2000 | Blackman |
| 6,220,722 B1 | 4/2001 | Begemann |
| 6,179,431 B1 | 6/2001 | Chien |
| 6,478,440 B1 | 11/2002 | Jaworski et al. |
| 6,499,860 B2 | 12/2002 | Begemann |
| 6,577,073 B2 | 6/2003 | Shimizu et al. |
| 6,648,496 B1 | 11/2003 | Elghoroury et al. |
| 6,762,563 B2 | 7/2004 | St-Germain et al. |
| 6,905,231 B2 | 6/2005 | Dickie |
| 6,911,915 B2 | 6/2005 | Wu et al. |
| 6,926,426 B2 * | 8/2005 | Currie ................... F21S 10/005 362/147 |
| 6,953,264 B2 | 10/2005 | Ter-Hovhannisian |
| 7,045,975 B2 * | 5/2006 | Evans ................ H01R 13/7175 315/159 |
| 7,145,179 B2 | 12/2006 | Petroski |
| 7,355,349 B2 | 4/2008 | Evans |
| 7,419,294 B2 | 9/2008 | Lai |
| 7,438,446 B1 | 10/2008 | McCann |
| 7,481,570 B2 | 1/2009 | Souza |
| 7,524,089 B2 | 4/2009 | Park |
| 7,568,829 B2 | 8/2009 | Chien |
| 7,632,004 B2 * | 12/2009 | Chien ................ H04N 5/23241 362/641 |
| 7,909,477 B2 | 3/2011 | Chien |
| 10,487,999 B2 | 11/2019 | Chien |
| 11,082,664 B2 * | 8/2021 | Chien .................... F21S 8/035 |
| 2003/0185020 A1 | 10/2003 | Stekelenburg |
| 2004/0046502 A1 | 3/2004 | Chien |
| 2006/0007709 A1 * | 1/2006 | Yuen ...................... F21S 8/035 362/641 |
| 2006/0072346 A1 | 4/2006 | Chien |
| 2006/0146527 A1 | 7/2006 | Vanderschuit |
| 2007/0103901 A1 | 5/2007 | Reid |

* cited by examiner

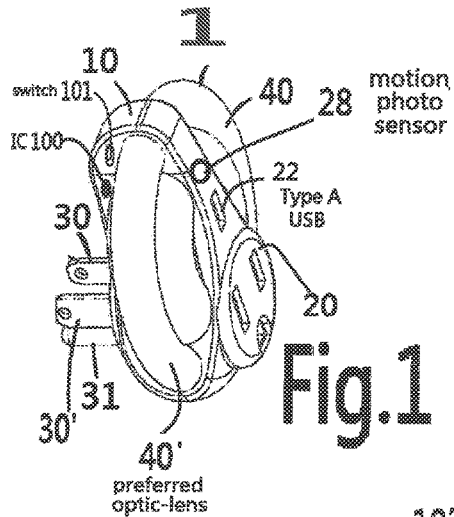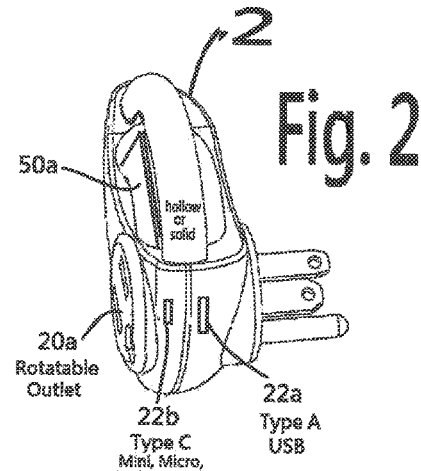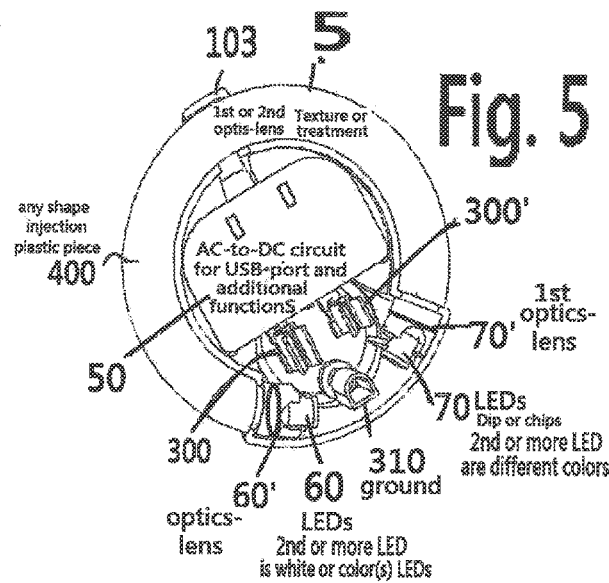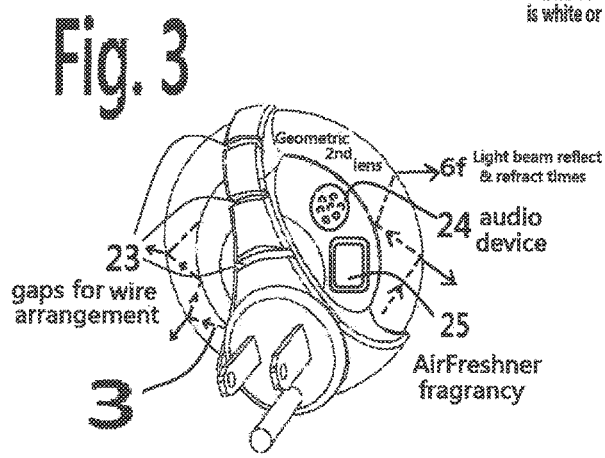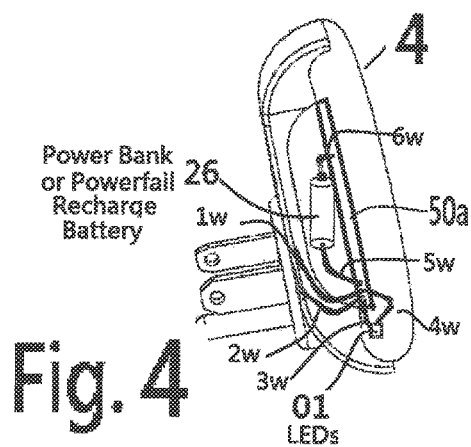

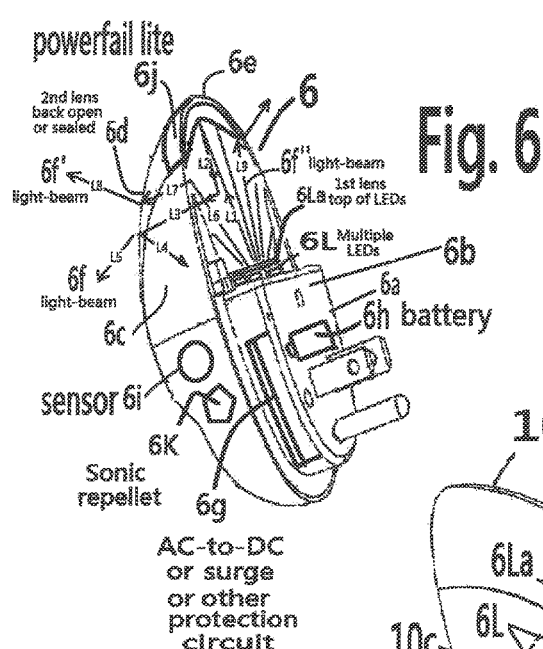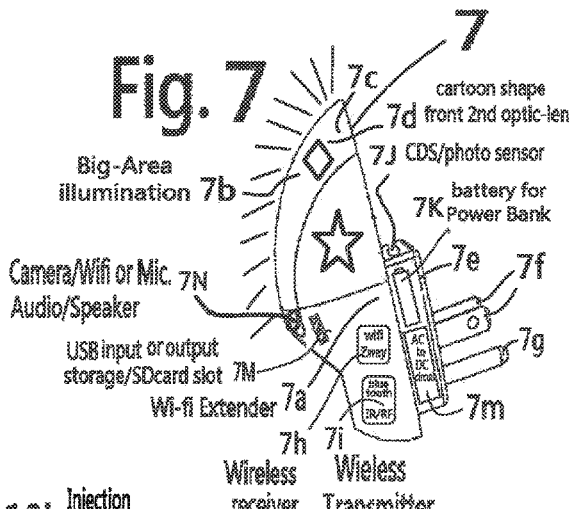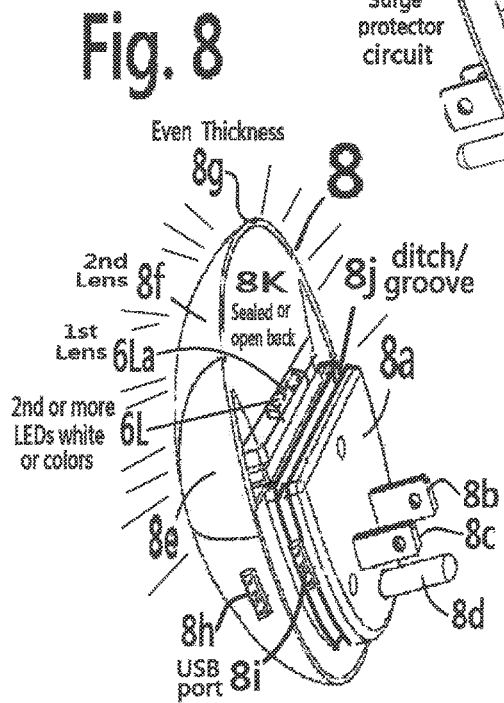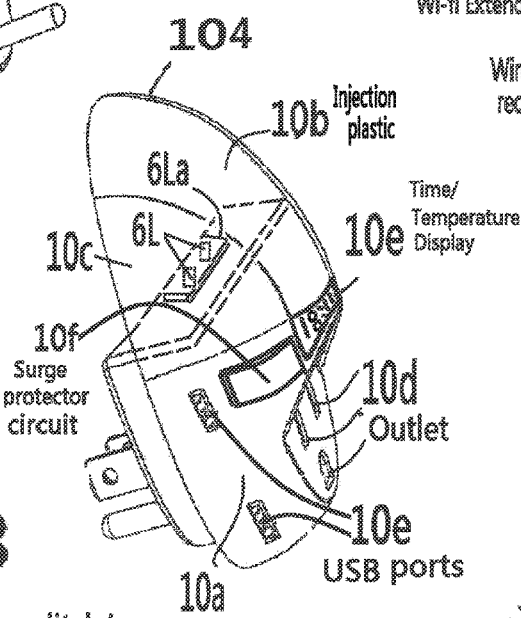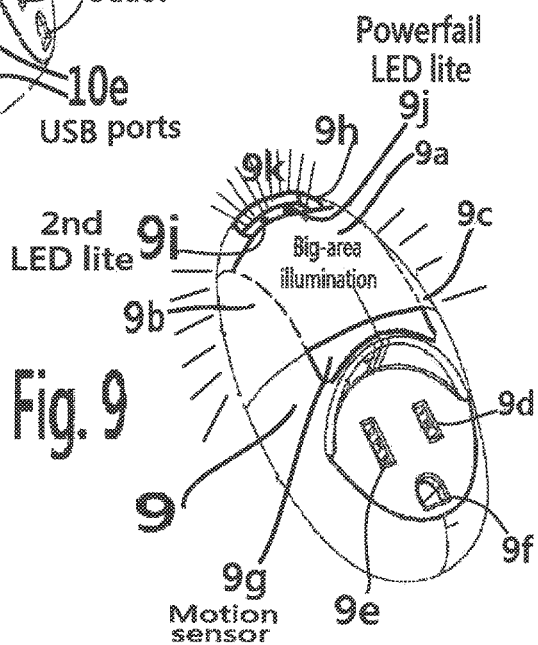

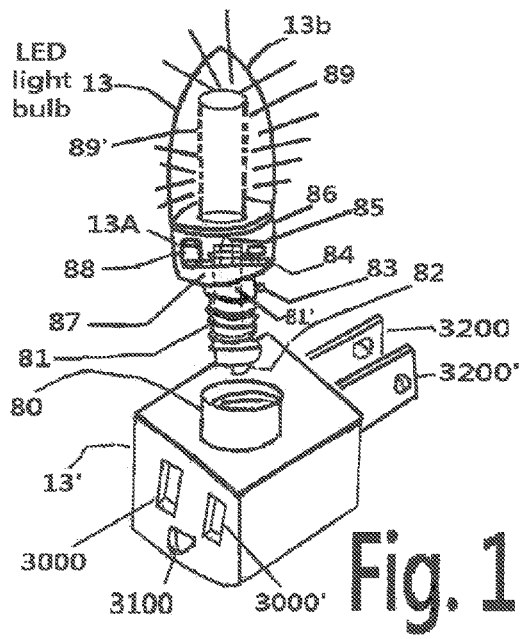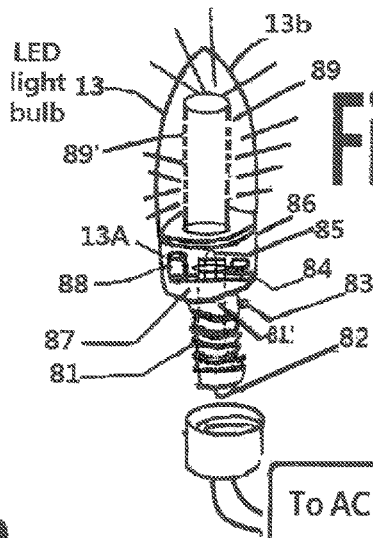
Fig. 13
Different with Parent Filed
6,227,679 5/8-2001
Fig. 13A
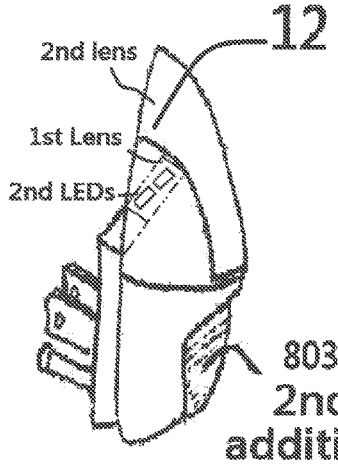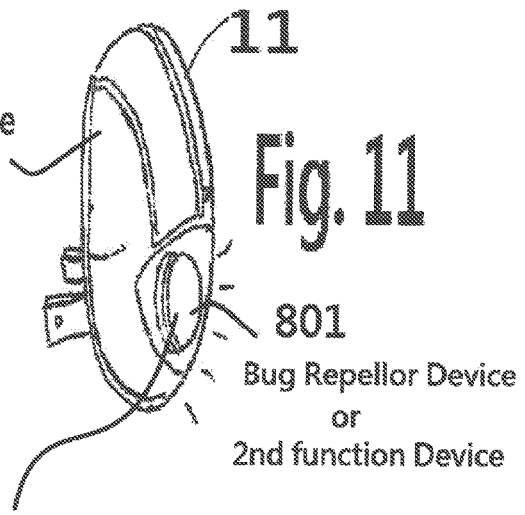
Fig. 12
Fig. 11
803
2nd or more
additional function(s)
circuit(s), Trigger-system(s), IC(s),
wireless controller, communication(s)

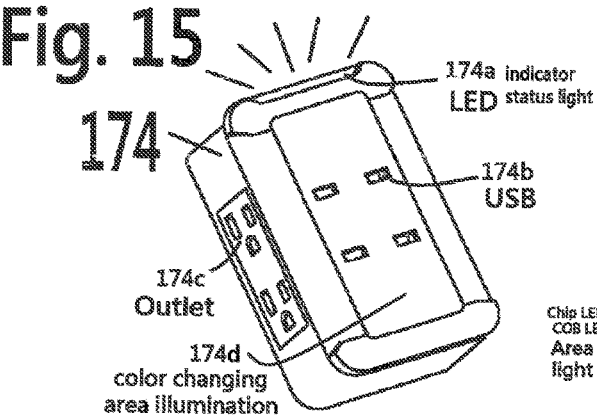
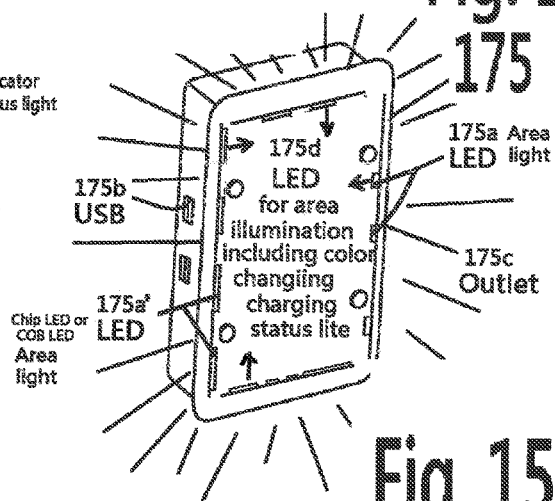
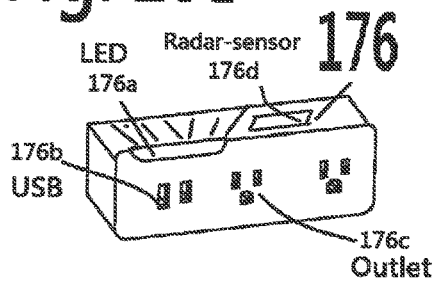
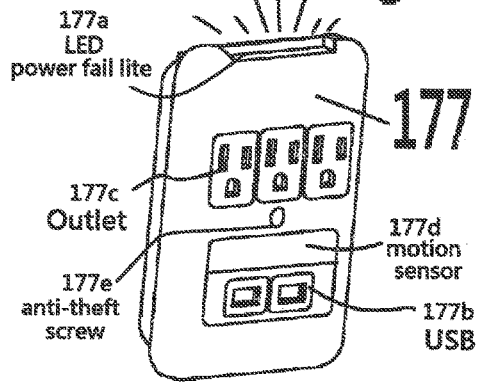
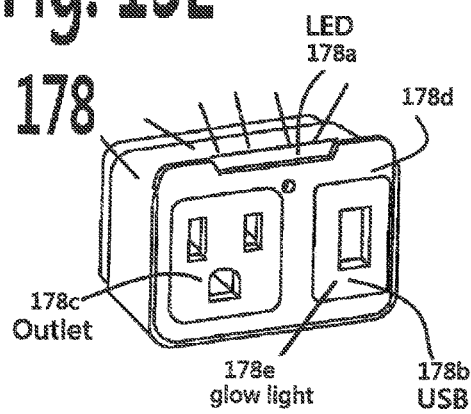
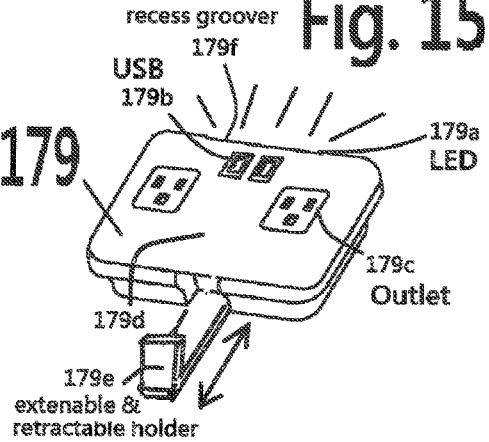

MULTIPLE FUNCTIONS LED NIGHT LIGHT

BACKGROUND AND SUMMARY OF THE INVENTION

The following copending U.S. patent applications by the same Inventor also are directed to night lights: Ser. No. 10/883,747, filed Jul. 6, 2004; Ser. Nos. 11/092,741; 11/094,215; 11/255,981; 11/498,881; 11/527,631; 11/498,874; 11/527,629; and 11/527,628.

In addition, the Inventor's U.S. Pat. Nos. 5,926,440; 6,158,868; 6,170,958; 6,171,117; 6,280,053 disclose arrangements of conductive for night lights and multiple function night lights incorporated time pieces. Other U.S. Pat. Nos. 4,947,291; 5,495,402; 5,662,408; 5,713,655; 5,803,579; 5,816,682; 5,833,350; 5,893,626; 5,998,928; 6,000,807; 6,010,228; 6,031,958; 6,033,087; 6,056,420; 6,132,072; 6,160,948; 6,161,910; 6,183,101; 6,190,017; 6,290,368; 6,337,946; 6,386,730; 6,390,647; 6,00,104; 6,411,524; 6,431,719; 6,509,832; 6,523,976; 6,550,949; 6,609,812; 6,623,416; 6,641,289; 6,648,496; and 6,709,126 all show different light sources and applications but none teaches an LED night light having multiple functions which may be selected from the group including an adaptor device, fan device, heat device, bug repeller device, sonic device, frequency device, or any other home electric appliance or device suitable for adding onto an LED night light.

The current invention offers a big improvement in power saving because it incorporates the low power consumption Light Emitting Diode (LED) to replace the incandescent bulb which normally uses a 4 Watt or 7 Watt or more power consumption light. A single LED normally has a 0.3 Watt +/−100% power consumption depending on the product design and illumination needed.

The current invention not only provides a power saving device but also reduces a consumer's monthly electricity expense. The current invention also supplies two or more additional practical functions to the consumer, which may selected from, for example, an air-freshener and/or (as described in copending U.S. patent application Ser. Nos. 11/527,631; 11/527,629; 11/498,881; 11/498,874; and 11/527,628; etc.) an adaptor device, sonic device, frequency device, bug repeller device, second light device, timepiece, electric message device, timer device, temperature device, surge protection device, electric short circuit protection device, base device for installation on an existing lamp socket, emergency light device, or any other electric device(s) used in a home to keep people comfortable or safe.

This current invention optionally may further incorporate the teachings of the copending application entitled "LED night light with more than one optics" concerning the inclusion in the LED night light of an optical element that improves the visibility of light beams from the LED.

All existing LED nightlights have the big problem that the LED unit can be seen by a viewer over a narrow viewing angle only, and that the brightness over that angle is too strong, resulting in spot-light effects (super bright in a small area). The copending application teaches multiple (more than one) optics to provide a big improvement from spot-light to linear or area brightness, thereby causing the spot-light effects to change to a nice looking lighting effect such as that provided by a fluorescent tube. It is very difficult to use only one piece of optics to cause the strong spot-light LED unit(s) to have nice and warm light effects that can be seen by a viewer. This is a big improvement in the LED night light.

The current invention further adds some other arrangement such as reflector(s), bubble(s), or lens(es) within any of the optics to increase the effects of modifying the narrow viewing angle light beams emitted out of the LED(s) to provide linear or area light effects.

Furthermore, the current LED night light invention solves several problems with the most popular night light in the market place. The most popular night light length is around 88 mm +/−50 mm (with base), The lens height is around 60 mm +/−30 mm (without base). The height from the wall outlet cover is around 35 mm +/−15 mm (from outlet cover surface). If the LED unit is placed on the same location as the outlet cover surface, the distance from the wall to the outside of the lens will be less than 35 mm +/−15 mm, which is too short to make the spot-light LED's into a surface or area photometric or lighted area. The problem is solved by using two optics to get a good surface or area lighting effect. In addition, the LED night light power consumption will fall within the 0.3 W +/−100% per LED range, whereas the power consumption of a bulb night light falls within 4 Watt +/−50% per bulb. So the LED night light will have a big power saving and reduce the monthly electric bill for the consumer.

The current invention not only provides a simple multiple function LED night light, but also provides excellent light performance. The LED night light with more than one function can add any function selected from, by way of example, an adaptor device, motion sensor device, PIR sensor device, air freshener, second light device, bug repellent device, sonic repellent device, surge protection device, emergency light device, time device, timer device, or any combination so the LED night light can be have nice light performance with more than single functions.

BRIEF DESCRIPTION OF THE DRAWINGS

FIGS. 1-4 are perspective views taken from different viewing angles showing a first preferred embodiment of a multiple function of LED night light.

FIG. 5 is a partially cut-away front view showing construction details of the preferred embodiment illustrated in FIGS. 1-4.

FIGS. 6-10 are perspective views at different viewing angles of a second preferred embodiment of a multiple function LED night light.

FIG. 11 is a perspective view of third preferred embodiment of a multiple function of LED light.

FIG. 12 is a perspective view of a fourth preferred embodiment of a multiple function LED light.

FIG. 13 and FIG. 13A are perspective views of a fifth preferred embodiment of a multiple function of LED light with a base device for installation on an existing lamp socket.

FIGS. 14 and 14A-14E, 15 and 15A-15E, 16, and 16A-16E are perspective views of additional embodiments of the invention with various combinations of power outlets.

DETAILED DESCRIPTION OF THE PREFERRED EMBODIMENTS

Figure 14:
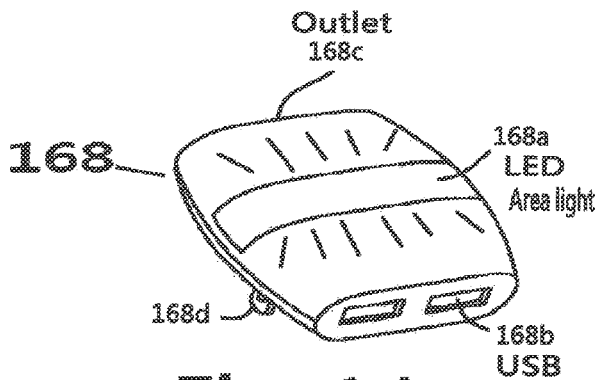
Figure 14A:
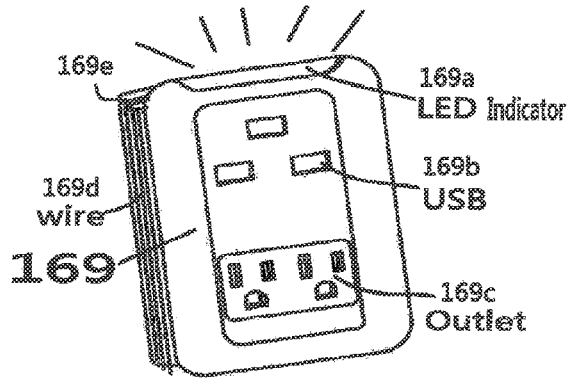
Figure 14B:
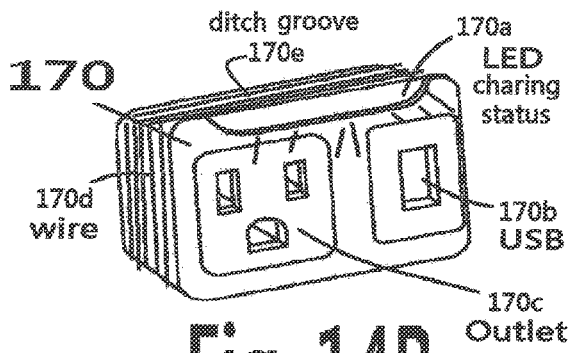
Figure 14C:
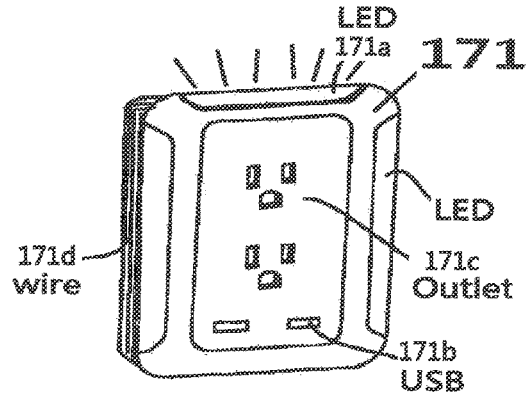
Figure 14D:
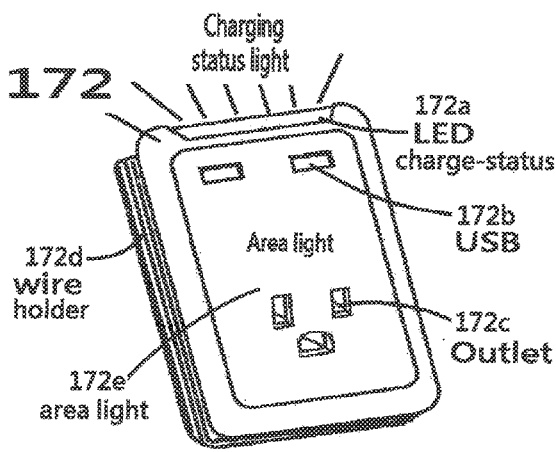
Figure 14E:
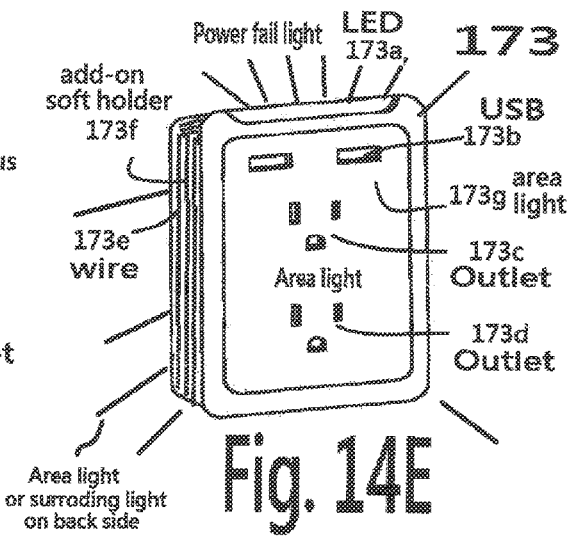
Figure 16:
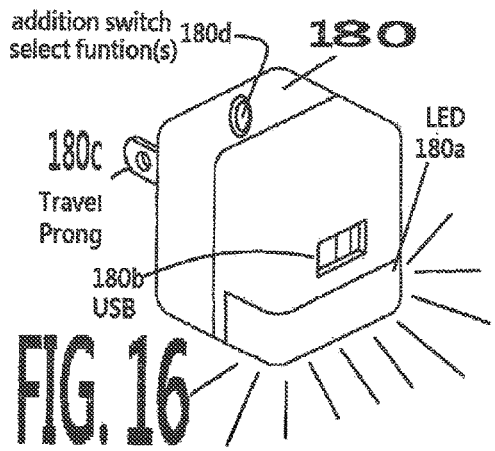
Figure 16A:
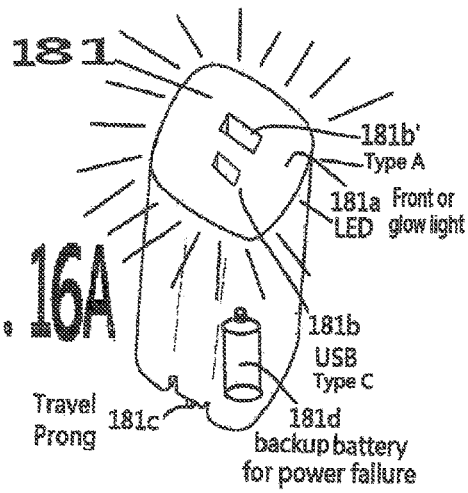
Figure 16B:
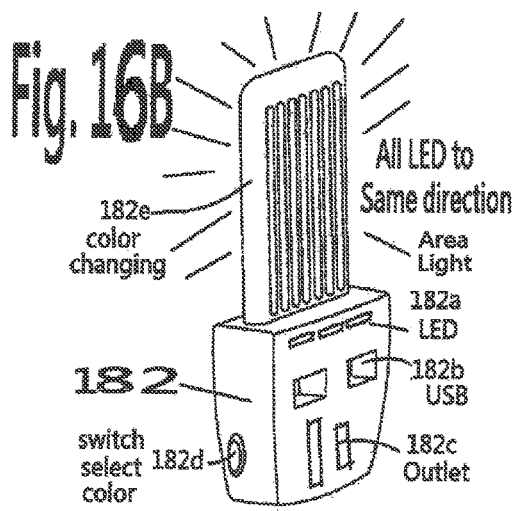
Figure 16C:
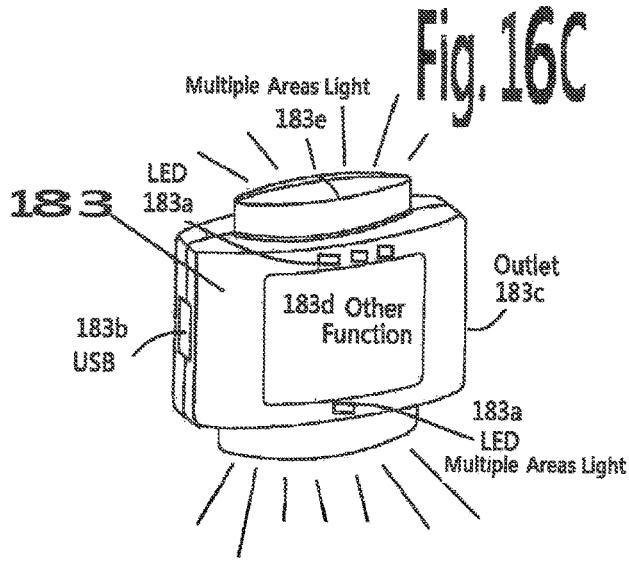
Figure 16D:
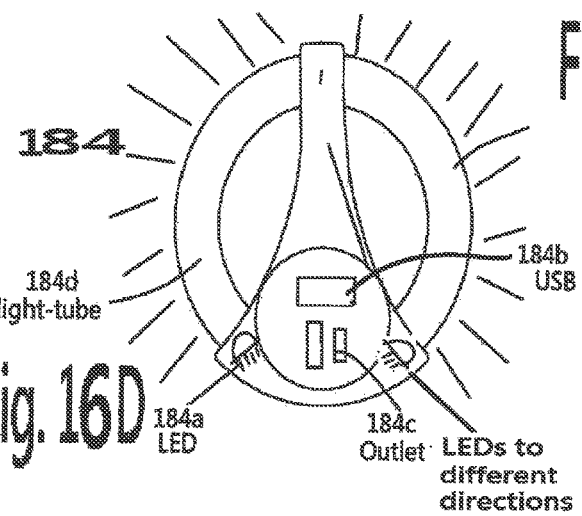
Figure 16E:
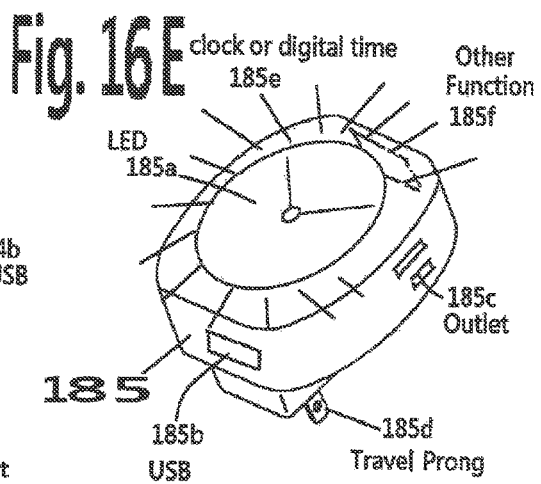
Figure 17A:
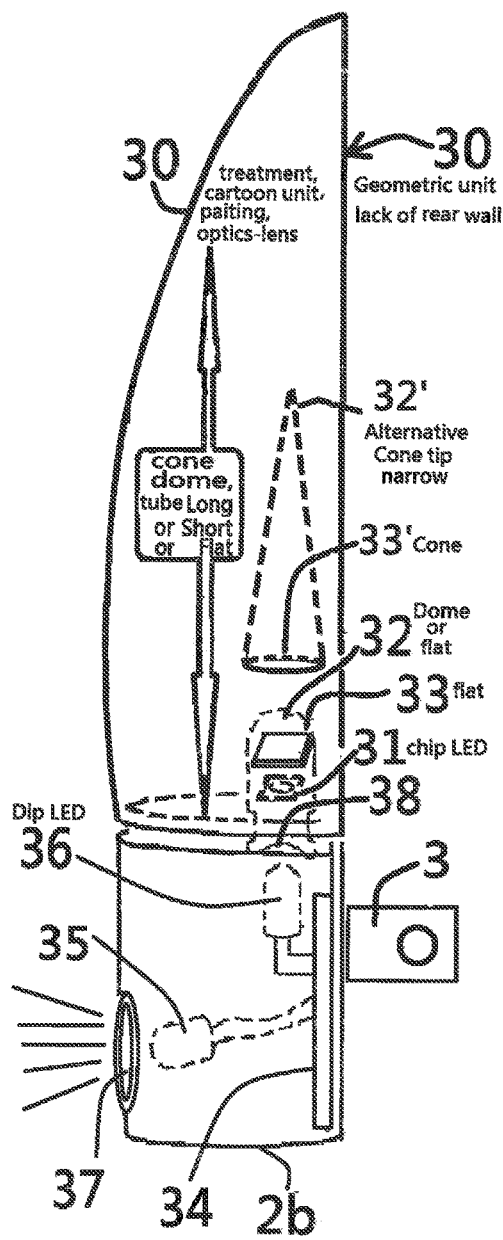
FIGS. 17A and 17B are side views of a night light of the parent application and a modified night light.
Figure 17B:
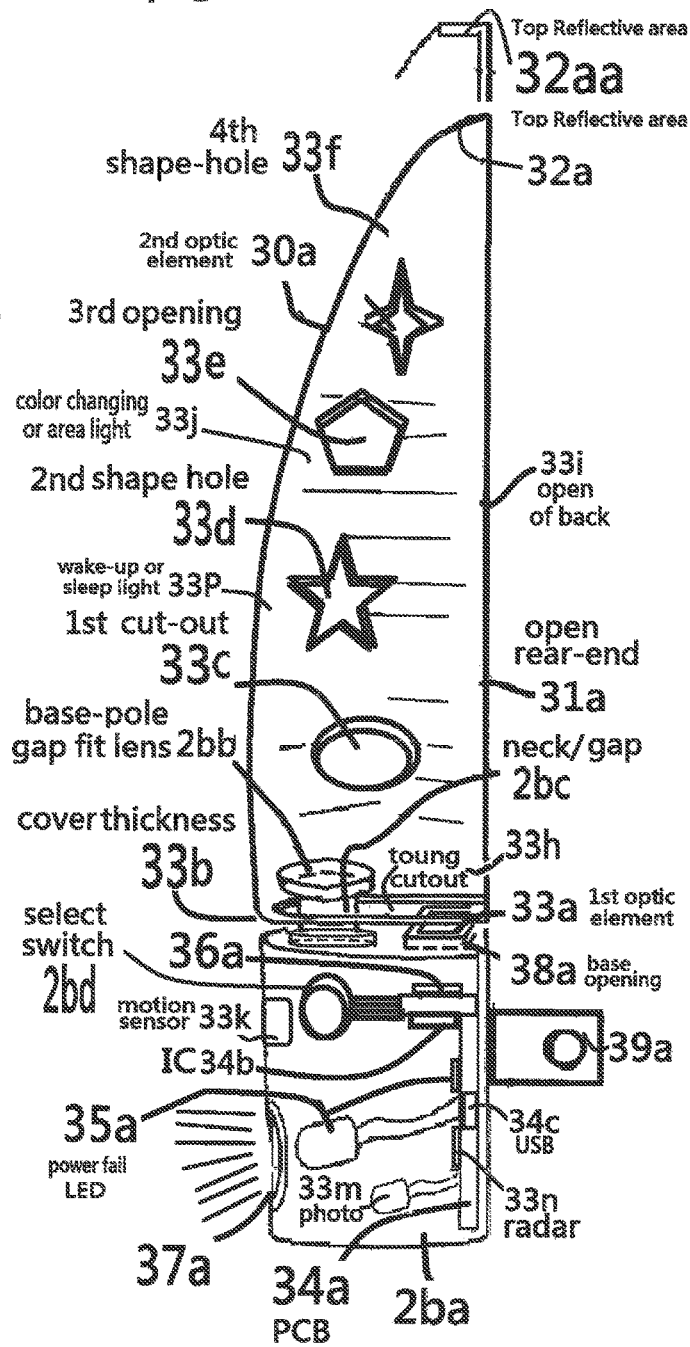
Figure 18:
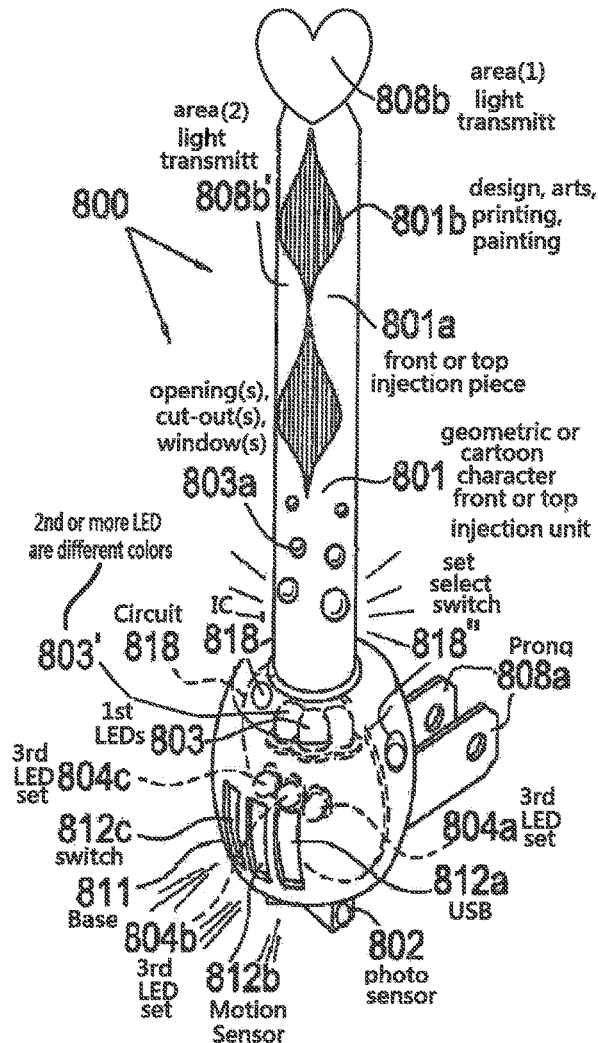
FIGS. 18 and 18A are perspective views of an upgraded night light and a night light disclosed in the parent application.
Figure 18A:
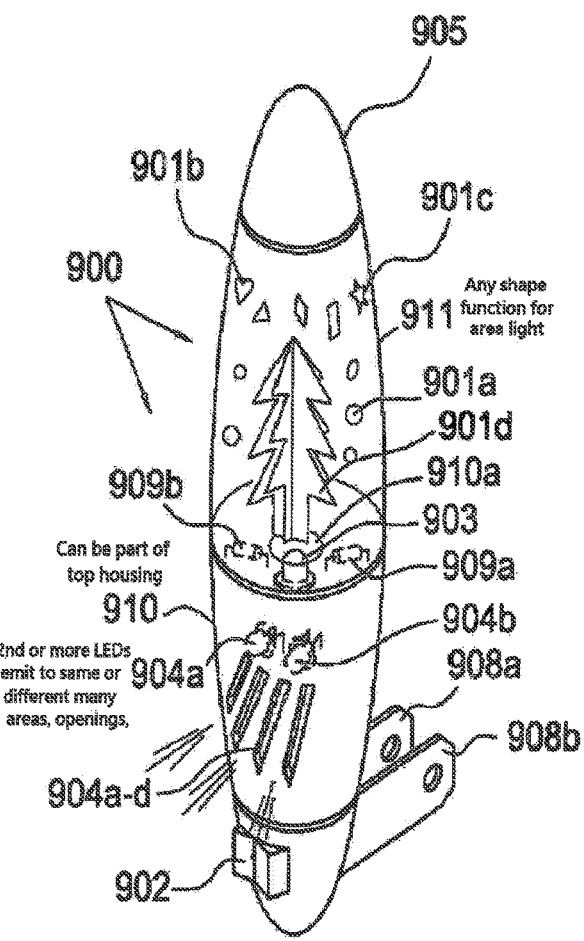

FIG. 1 shows a first preferred embodiment of a multiple functions LED night light in which the added function is adaptor device. The added function(s) may alternatively be selected from the devices described in FIG. 13 shown bug-repeller or-and $2^{nd}$ electric device or-and copending U.S. patent application Ser. Nos. 11/527,631; 11/527,629; 11/498,881; 11/498,874; and 11/527,628 etc., such as an (i) air freshener, (ii) adaptor device, (iii) sonic device, (iv) frequency device, (v) bug repeller device, (vi) second light device, (vii) timepiece, (viii) electric message device, (ix) timer device, (x) temperature device, (xi) surge protection device, (xii) electric short circuit protection device, (xiii) base device for installation on an existing lamp socket, (xiv) emergency light device, or (xv) any other electric device(s) suitable for home use to keep people comfortable or safe. The added function(s) may be one to N (any number) to make a very practical multiple functions LED night light.

As shown in FIG. 1, the multiple function LED night light (1) has a back housing (10) assembled with a front housing (20) and arranged to capture prong (30) (30') (31) within and enable delivery of electricity from the outlet AC power source through the adaptors (20) to the other electric appliance device (not shown). An optics-lens (40) exhibits light effects from the inner LED or LEDs to provide a light performance having predetermined functions, time, duration and so forth as required.

FIGS. 2, 3, 4 show the multiple function LED night light of FIG. 1 from different viewing angles. FIG. 5 shows details of the inner construction of one of preferred embodiment of variety of the multiple function LED night light (5) which has a back housing (100) and which holds an optic-lens or optics medium (400) having a ring design which is adjacent a circuit board (50) that connected to prong (300) (300') to deliver input home electricity to circuit-board (50) and the LEDs (60) (70) and cause the LEDs (60) (70) to emit a light beam into the optic-lens or optics medium (400) from the two input ends (60') and (70'). The preferred ring optics-lens or preferred optic-medium has input ends are "U" shaped so as to allow as many of the light beams emitted from the LEDs (60) (70) to enter the optic-lens or optics medium as possible. Some applications may have other designs for the optic-lens or optics medium and input ends, which is not a limitation for the current invention's preferred embodiment description. The input ends design can be any type which is still within the current invention scope. The prong (310) is a grounded type to provide more safety for the adaptor device. This prong arrangement can be varied depending on the different requirements of safety authorities or governments.

The optic-lens or optics medium and of FIG. 5 may have different arrangements that use sand-blasting to make the surface very rough and allow all the light to travel within without excess leakage, or use a plurality of the air-bubbles (or equivalent reflectors) inside the optic-lens or optics medium and to cause light beams from the LEDs to exit the optic-lens or optics medium big-surface not the ends and make whole piece or big-surface of optics-lens or-and optics medium with splendid bright spots showing along the length of the medium.

As shown in FIG. 5), the circuit (50) may incorporate desired electric components selected from the group including, alone or in combination, at least one resistor, capacitor, switch, sensor, diode, inductor, transformer, integrated circuit (hereafter as IC), or any available components suitable for electrically driving LED(s) to have predetermined functions, duration, time, effects, and/or brightness. The appropriate conductive-piece(s) used for the electric connection to the prong (300) (300') (310) and LEDs (60) (70). The conductive-piece(s) can be obtained from the marketplace and may include electric wires, and/or a wire-harness, cable, spring, metal piece, or other conductive-piece(s) without departing from the scope of the invention, as long as an electric signal can be delivered from the circuit (50) to the prong and LEDs.

FIGS. 6-10 show the same features as FIGS. 1-5, the only difference being the different housing design with different space to arrange the LEDs, prong, circuit, and added device(s) on the LED night light. Therefore, FIGS. 6-10 are not discussed in further detail herein.

FIG. 11 shows a multiple function LED night light, in which the added function (801) can be selected from the group including any as above and below discussed (i) to (xv) 15 examples for $2^{nd}$-functions list but not limited for these 15 examples of $2^{nd}$ or more functions, or-and as disclosed in copending U.S. patent application Ser. Nos. 11/527,631; 11/527,629; 11/498,881; 11/498,874; and 11/527,628 etc., of an air freshener, adaptor device, sonic device, frequency device, bug repeller device, second light device, timepiece, electric message device, timer device, temperature device, surge protection device, electric short circuit protection device, base device for installation on an existing lamp socket, emergency light device, or any other electric device(s) suitable for home use to keep people comfortable or safe.

From FIG. 12 also shows a multiple function LED night light whose added functions can be selected from the above listed functions.

FIG. 13 shows a multiple function LED night light in which a special LED bulb (13) is included in the existing multiple function bulb night light housing with added function (13'). The multiple function LED night light of FIG. 13 has at least one LED device is installed on a geometric base that also has the added electric, mechanical, or chemical function. The LED light unit has base and has a bulb socket to accept the conventional bulb base, which may be selected from a screw type, pin type, rivet type, or knob type. The LED device has built-in circuit to change the original LED-light prong input-end AC electric signal to an LED's DC electric signal so as to turn on the LED(s) to exhibit predetermined function, duration, time, and/or brightness and light effects. As shown in FIG. 13, the LED-light base (13') has a female bulb socket (80) and added adaptor function provided by the adaptor receptacles (3000) (3000') (3100), which offer electricity to other electric appliances while the prong (3200) (3200') are connected to the wall outlet. At the same time, while prong (3200) (3200') are connected with the wall outlet power source, the bulb socket (80) also will receive the wall outlet AC power source electric signal, which in the USA is around 110 Volt, 60 Hz, to turn on the said LED bulb. On the other hand, specially designed LED bulb device (13) has a built-in circuit to change the wall outlet power source of 110V AC, 60 Hz to the working voltage and frequency of the LED(s) with desired control components such as a photo sensor, PIR sensor, manual switch, or other control available in the marketplace to turn on LED(s) according to pre-determined functions, brightness, duration, and time.

The LED bulb (13) that fits into the bulb socket (80) has a base type (81) which may be but is not limited to a screw type base as shown in FIG. 13. The bulb base (81) has two electric terminals (83) and (82) to connect with electric signal electrodes (not shown) through an inner lamp holder (80) which is connected with a prong (3200) (3200'). The AC electric signal from the two electric terminals (83) and (82) is supplied to the circuit board (81'), which changes the AC electric signal from home appliance electric current to LED working DC current and turns on the LED (85) for single color or multiple colors to provide a desired light performance. The LED (85) is located on the side of the circuit board (81') and connected with circuitry (81') and circuitry connect with the bulb base electric terminals (82) (83) by conventional conductive-piece in circuit board (81'). The electric components (88) (85) may be installed on the circuit board (81') or connected by conductive-piece (87) (84) away from the circuit board (81') because some components may be too big and unable to fit within the bulb base (81). The circuit board (81') is a narrow elongated board inserted into the bulb base (81), which is different with the prior art U.S. Pat. No. 6,227,679 (Zhang et al.) issued on May 8, 2001. The Zhang patent discloses a circuit board located on the top of the base, in a vertical relation to the circuit board and base. Also, in the arrangement of Zhang, the LEDs are not located on one side of the circuit board but rather are applied on the circuit board with a certain angle to the circuit board surface. This is because Zhang does not realize that the distance between the LED tip and the top cover is way too close and it is impossible to eliminate the spot-light problem of an LED light beam therefore cannot get a good light performance on the bulb surface. The current invention uses the invention described in one of the copending applications listed above, of an LED night light with more than one optics-lens, to make the spot-light beam into an area-light by first optics-lens. By adding a second optics-lens, the light beams brightness will be very close at every point on the desired area or surface.

As shown in FIG. 13, LED (85) on is situated on the edge of the circuit board (81') and positioned such that light beams from the LED are input to the first optics-lens (89) to cause the light beams to travel within the first optics-lens (89). The top may use a dome shape design or a "V" shape design to collect light beams that hit the top area of the first optics-lens. It will be appreciated that all equivalent treatments such as metallization of the top area or adding reflective arrangements within the first optics medium will be still fall within the scope of the invention. The LED device (13b) with screw type base can fit into a bulb night light's base socket (80) to replace the bulb and let the existing bulb night light become an LED night light without having to purchase a brand new unit to save money and change the big power consumption device into a lower power consumption device in seconds.

This arrangement solves the problem with the arrangement disclosed in the Zhang patent cited above that there is not enough space in a night light having the most popular dimensions to achieve a good area lighting effect. The most popular night light length is around 88 mm +/−50 mm (with base). The lens height is around 60 mm +/−30 mm (without base). The distance from the wall outlet cover to the highest point of the night light edge is around 35 mm +/−15 mm (from outlet cover surface). If placed in the same location as the existing bulb night light, the distance from the bulb socket to the wall outlet surface will be less than 35 mm. This distance from the wall to outside of the lens will only be less than 35 mm+/−15 mm. It is too short to change the spot-light effect of the LEDs into a surface or area lighting effect. The solution, as disclosed in the copending application is to use two optics to get a good surface or area lighted effect. This will be the best because LED night light power consumption falls within the 0.3 W +/−100% per LED range, whereas a bulb night light falls within a 4 Watt +/−50% per bulb range. As a result, the LED night light will have a big power saving and help reduce monthly electric bills for the consumer.

From above discussed and mentioned of preferred embodiments to show the scope of the current invention, it is appreciated that any alternative or equivalent functions of design still within the scope of the invention but not limited to all above discussion and mentioned details. The alternative or equivalent arrangement, process, installation or the like design, changes from the current invention still fall within the scope of the current invention.

I claim:

1. An LED night light, comprising:
   at least one first optical lens positioned in front or on top of at least one LED to eliminate an LED spotlight effect and transmit light beams emitted by the at least one LED; and
   at least one second optical lens having a front surface through which a first light beam exiting from the first optical lens passes so that the first light beam is shown on the front surface of the second optical lens, and a rear opening through which a second light beam exiting from the at least one first optical lens is transmitted directly to a wall having an electrical outlet into which the LED night light is plugged, without passing through the second optical lens,
   wherein the at least one second optical lens is a cover or outer lens assembled with a prong base, and
   wherein the prong base further includes an AC outlet or a USB port.

2. An LED night light, comprising:
   at least one first optical lens positioned in front, on top, or on a side of at least one LED to transmit a light beam emitted by the LED; and
   at least one second optical lens, the second optical lens being a unit assembled to a prong unit,
   wherein the prong unit includes an AC outlet or USB port,
   wherein the at least one second optical lens is a cover or outer lens, and
   wherein a light beam exiting the first optical lens is emitted to at least two surfaces including a surface of
   (1) the second optical lens, and
   (2) a wall having an outlet into which the LED night light is plugged.

3. An LED night light, comprising:
   more than one optical lens to transmit a narrow angle light beam emitted by an LED and change the narrow angle LED light beam into an LED light beam having a wider area, a changed viewing angle, or a reduced LED spotlight effect,
   wherein the prong unit includes an AC outlet or USB port,
   wherein the wider area, changed viewing angle, or reduced LED spotlight effect is created by emission of the narrow angle light beam through a first optical lens and then emission to (1) a surface of a second optical lens, and (2) a surface of a wall having an outlet into which at least one prong of the LED night light is plugged, and
   wherein the second optical lens is a unit assembled to a prong base and is an outer or cover lens.

4. An LED night light, comprising:
   an LED;
   at least one first optical lens for transmitting a narrow light beam emitted by the LED;
   at least one second optical lens on a front of the night light, the first optical lens and the second optical lens configured to change the narrow light beam from the LED into a light beam that
   (i) does not form a bright light spot, or
   (ii) has a substantially even brightness, the light beam exiting from the first optical lens being shown on
(A) the second optical lens, and
(B) without passing through the second optical lens, a wall having an outlet into which at least one prong of the LED night light is plugged, wherein the LED night light includes an AC or USB outlet.

* * * * *